United States Patent
Sun et al.

(10) Patent No.: US 8,830,890 B2
(45) Date of Patent: Sep. 9, 2014

(54) TERMINAL BATTERY AWARE SCHEDULING

(75) Inventors: Ying Sun, Sundbyberg (SE); Kristina Jersenius, Linköping (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 198 days.

(21) Appl. No.: 13/387,422

(22) PCT Filed: Jan. 18, 2012

(86) PCT No.: PCT/EP2012/050673
§ 371 (c)(1),
(2), (4) Date: Jan. 27, 2012

(87) PCT Pub. No.: WO2013/107505
PCT Pub. Date: Jul. 25, 2013

(65) Prior Publication Data
US 2013/0182624 A1 Jul. 18, 2013

(51) Int. Cl.
*H04W 52/02* (2009.01)

(52) U.S. Cl.
USPC .......................................... 370/311; 370/394

(58) Field of Classification Search
CPC ...... H04W 52/00; H04W 52/02; H04L 45/00; H04L 45/32; H04L 45/36; H04L 49/90
USPC .......................................... 370/310–311, 394
See application file for complete search history.

(56) References Cited

U.S. PATENT DOCUMENTS

| | | | |
|---|---|---|---|
| 2004/0218617 A1* | 11/2004 | Sagfors | 370/412 |
| 2010/0232366 A1* | 9/2010 | Iwamura et al. | 370/329 |
| 2010/0234060 A1 | 9/2010 | Beamish | |
| 2010/0238875 A1* | 9/2010 | Sung et al. | 370/329 |
| 2011/0075679 A1* | 3/2011 | Yui | 370/412 |
| 2011/0158182 A1* | 6/2011 | Biton et al. | 370/329 |
| 2012/0039174 A1* | 2/2012 | Robin et al. | 370/235.1 |
| 2013/0070594 A1* | 3/2013 | Garcia Martin et al. | 370/235 |

* cited by examiner

*Primary Examiner* — Andrew Chriss
*Assistant Examiner* — Romani Ohri
(74) *Attorney, Agent, or Firm* — Coats & Bennett, PLLC

(57) ABSTRACT

The present invention relates to a method and device (15) for scheduling transmission of queued data packets of at least one terminal (11, 12, 13). To this end, information indicating packet queue time and queue buffer size is acquired. Further, it is determined, for each queue of the at least one terminal, whether either estimated data packet delay for any queued data packet exceeds a delay threshold value or whether number of data packets queued exceeds a buffer size, and if so, the data packets of each queue is scheduled for transmission from the at least one terminal as a respective single bundle of data.

8 Claims, 3 Drawing Sheets

TERMINAL BATTERY AWARE SCHEDULING

TECHNICAL FIELD

The present invention relates to methods of performing battery-saving in a terminal and a method of scheduling transmission of data packets queued in at least one terminal. The present invention further relates to devices corresponding to the aforementioned methods.

BACKGROUND

Energy efficiency is a key issue for mobile communication networks, since reduced power consumption leads to a prolonged battery lifetime for battery-operated terminals. Today, energy efficiency is considered in terminal design, and power saving schemes such as discontinuous reception (DRX) are utilized in order to reduce power consumption by limiting the time a terminal has to monitor downlink (DL) transmissions. With regard to uplink (UL) transmissions, it has been observed that the power consumption related to UL transmission increases with the number of transmissions. However, so far terminal energy efficiency is not taken into account in UL scheduling.

With evolving fourth-generation (4G) wireless technologies, including for instance complex modulation algorithms and advanced coding schemes, the receivers require computationally complex circuitry that quickly drains the terminal on battery power, thus limiting the use of enriched 4G services. Thus, energy efficiency is also important when designing the air interface and the networks.

SUMMARY

An object of the present invention is to solve, or at least mitigate, the above mentioned problems in the art.

This object is achieved in a first aspect of the present invention by a method of scheduling transmission of queued data packets of at least one terminal. The method comprises the step of acquiring information indicating packet queue time and queue buffer size. Further, the method comprises the steps of determining, for each queue of the at least one terminal, whether either estimated data packet delay for any queued data packet exceeds a delay threshold value or whether number of data packets queued exceeds a buffer size threshold value, and if so, scheduling the data packets of each queue for transmission from the at least one terminal as a respective single bundle of data.

Further, a device for performing battery-saving of a terminal is provided. The device comprises a processing unit arranged to determine whether terminal battery-saving should be performed and provide, to the terminal, a less power-consuming communication service equivalent to that presently used, which equivalent communication service has a lower Quality of Service (QoS).

Thus, for one or more terminals, a number of data packets comprised in one or more queues are scheduled for transmission. In practice, data packets of a great number of terminals are to be scheduled and each terminal generally comprises a plurality of queues. As an example, different queues are used in each terminal for data packets of different QoS classes, where data packets of a QoS class typically are lumped together in a particular queue. However, at the other extreme, data packets comprised in a single queue of one terminal are scheduled for transmission. A scheduler managing the scheduling of packet data transmission acquires queue information of each terminal, which information indicates packet queue time and queue buffer size. Typically, the scheduler estimates the packet queue time on the basis of a scheduling request or buffer status report received from a terminal, whereas information regarding the queue buffer size is sent from the terminal to the scheduler. For each queue of every terminal, it is determined whether either (a) estimated packet delay for any queued data packet exceeds a delay threshold value or (b) the number of packets queued exceeds a buffer size threshold value, whereby a decision can be made whether the queued packets are considered ready for transmission, in which case the queued packets are scheduled. Advantageously, the data packets of each queue are scheduled for transmission as a respective single bundle of data. Thus, the data packets of each queue are combined into a single data set for transmission, resulting in one single bundle for each queue. By considering an estimated packet delay of the data packet having spent the longest time in the queue, it is ensured that QoS parameters with respect to maximal allowed packet delay are complied with. Further, by considering whether a buffer size threshold value is exceeded, it is ensured that all data packets can be scheduled for transmission as a single bundle of data. In practice, there are limitations on how much data a single bundle is allowed to comprise for transmission to be possible, for instance due to QoS requirements; if e.g. delay for transmitting a single bundle exceeds packet delay budget for Voice over IP (VoIP), the VoIP QoS cannot be met. Maximum bundled packet size that can be supported further depends on radio channel conditions. The different queues may have different threshold values regarding delay and buffer size. In fact, in case one queue is associated with a particular QoS while another queue is associated with another, the two queues are likely to have different threshold values.

Investigations show that the power consumption of a terminal when performing UL transmission largely depends on the number of transmissions made. Thus, given the same amount of data to be transmitted, it is more energy efficient for the terminal to transmit the given amount of data in a single transmission as compared to transferring the data over a plurality of transmissions.

The present invention thus advantageously provides a scheme for scheduling UL transmissions which takes into account the energy efficiency of the terminal. Such scheduling is achieved by considering packet delay and buffer size for controlling packet bundling such that data packets are comprised in a single transmission. By reducing the number of UL transmissions, the terminal power consumption is reduced.

The scheduling of data packets for transmission in a single data bundle is in an embodiment of the present invention managed by an uplink scheduler, being a radio resource management function in eNodeB. This is advantageous in that the scheduling is managed by a central function which has the capability of supervising the terminals and thus take into account power aspects of all terminals, and ultimately optimize overall system performance.

In an embodiment of the present invention, transmission of the scheduled data packets of each at least one queue is prioritized on the basis of a weight assigned to each at least one queue. Thus, in case a plurality of queues are to be scheduled for one or more terminals, it may be necessary to assign to the queues an order of precedence, thus giving each set of queue packet data to be bundled into a single transmission an order of priority. This is implemented by assigning a weight to each queue.

In another embodiment of the present invention, transmission of the scheduled data packets of each queue is prioritized on the basis of a combination of the estimated packet delay for any queued data packet and the number of packets queued. A queue is given a higher order of priority the more the estimated packet delay and the number of queued packets exceed their respective threshold value. Thus, in case a plurality of queues are to be scheduled for one or more terminals, it may be necessary to assign to the queues an order of precedence, thus giving each set of queued data packets to be bundled into a single transmission an order of priority. Typically, in case neither of the two thresholds is exceeded, the terminal will not be scheduled for transmission. However, in case any one or both of the two thresholds are exceeded, the data packets in the particular queue are considered important and urgent to transmit, and will thus be given priority.

In a further embodiment of the present invention, transmission of the scheduled data packets of each terminal is prioritized on the basis of a combination of the estimated packet delay for any queued data packet and the number of packets queued. A terminal is given a higher order of priority the more the estimated packet delay and the number of queued packets exceed their respective threshold value. Similar to the previous embodiment, in case a plurality of terminals are to be scheduled to transmit data packets of one or more queues, it may be necessary to assign to the terminals an order of precedence, thus giving each set of queued data packets to be bundled into a single transmission an order of priority. Again, in case neither of the two thresholds is exceeded, the terminal will not be scheduled for transmission. However, in case any one or both of the two thresholds are exceeded, the data packets in the particular queue are considered important and urgent to transmit, and will thus be given priority.

It should be noted that these two embodiments can be combined; it is possible that particular queues are given priority at one instance and that particular terminals are given priority at another. For instance, a first queue of a first terminal may have a higher priority than a first queue of a second terminal, while a second queue of the first terminal is equal in priority to a second queue of the second terminal. The first queue of the first terminal will thus be prioritized for transmission at the expense of the first queue of the second terminal. However, with respect to the second queues of the respective terminal, the second terminal may be higher in rank than the first terminal, in which case the second queue of the second terminal is given priority at the expense of the second queue of the first terminal.

In yet another embodiment of the invention, the prioritizing of transmission of the scheduled data packets further considers quality of the channel to be assigned for transmission, wherein a higher channel quality results in a higher order of priority. Advantageously, by taking into account the transmission channel quality, it is possible to further improve energy efficiency in that a single-bundle transmission which can be sent over a channel of good quality will require less power output from the terminal.

In still another embodiment of the present invention, terminal battery-efficiency is traded for user performance. Thus, the scheduler determines whether terminal battery-saving should be performed and if that is the case, the delay threshold value and/or the buffer size threshold value is/are modified. For instance, if the values are increased, a larger amount of data can then be included in each bundle scheduled for transmission resulting in improved energy efficiency on the one hand, but worse QoS performance in terms of e.g. delay on the other. Hence, the values chosen for the thresholds result in trade-offs between obtained energy efficiency and experienced QoS. Consequently, the scheduler can modify the above mentioned threshold values such that terminal power consumption is traded for QoS performance.

The object stated hereinabove is achieved in a second aspect of the present invention by a method of performing battery-saving for a terminal. The method comprises the steps of determining whether terminal battery-saving should be performed and providing, to the terminal, a less power-consuming communication service equivalent to that presently used, which equivalent communication service has a lower QoS. Thus, battery efficiency is traded for user performance; if a terminal engages in a communication service which is less power-intensive than, but from the point of view of content identical to that presently performed, for instance if the terminal is close to running out of battery power, battery life can be prolonged at the expense of lower QoS. Thus, an eNodeB determines whether battery-saving is to be performed and accordingly provides the communication service with a lower QoS.

Further, a device for performing battery-saving of a terminal is provided. The device comprises a processing unit arranged to acquire a parameter specifying target power consumption of the terminal and provide a communication service to the terminal such that the terminal power consumption required to performing the communication service complies with the parameter.

In an embodiment of the present invention according to the second aspect of the invention, the eNodeB receives a message from the terminal indicating that battery-saving is requested. Advantageously, the terminal can itself indicate that battery-saving is required. In an alternative embodiment, the eNodeB estimates terminal power consumption and determines whether battery-saving should be performed on the basis of the estimated terminal power consumption. For instance, the eNodeB has access to a model over terminal battery consumption and estimates when the terminal battery reaches its limit (or if battery-saving should be performed for other reasons).

This object is achieved in a third aspect of the present invention by a method of performing battery-saving in a terminal. The method comprises the steps of acquiring a parameter specifying target power consumption of the terminal and providing a communication service to the terminal such that the terminal power consumption required to performing the communication service complies with the parameter. Advantageously, a terminal can be identified as a terminal generally wishing to save battery. This may for instance be indicated in the Service Profile Identifier (SPID) of the terminal by having the user sign a "power-saving" service with the operator. Thus, the eNodeB will check a registered power parameter and provide a QoS in line therewith.

Further, a device for scheduling transmission of queued data packets of at least one terminal is provided. The device comprises a processing unit arranged to acquire information indicating packet queue time and queue buffer size and determine, for each queue of the at least one terminal, whether either estimated data packet delay for any queued data packet exceeds a delay threshold value or whether number of data packets queued exceeds a buffer size threshold value. If so, the data packets of each queue are scheduled for transmission from the at least one terminal as a respective single bundle of data.

It should be noted that the packet delay threshold values and buffer size threshold values could be predetermined in certain embodiments of the invention, whereas in other embodiments of the invention, the threshold values could be set on-the-fly.

It is noted that the invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art.

Figure 1:
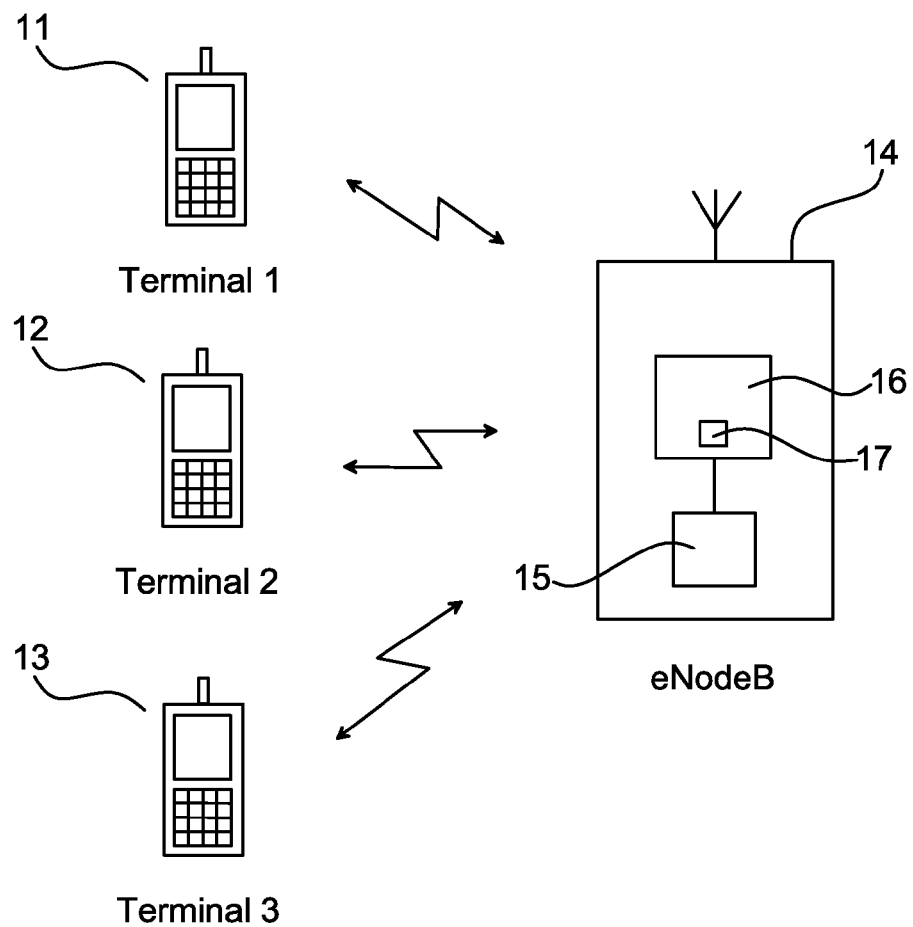
FIG. 1 illustrates a network of terminals communicating with an eNodeB, according to embodiments of the present invention.

FIG. 1 illustrates a network of terminals 11, 12, 13 communicating with a device 14 according to embodiments of the present invention, which device e.g. may be an eNodeB. The scheduling of data packets for transmission in a single data bundle undertaken in different embodiments of the method of the present invention is managed by an uplink scheduler 15, being a radio resource management function in the eNodeB. This is advantageous in that the scheduling is managed by a central function which has the capability of supervising the terminals 11, 12, 13 and thus take into account power aspects of all terminals, and ultimately optimize overall system performance. In practice, the uplink scheduler is embodied on the form of one or more microprocessors arranged to execute a computer program 17 downloaded to a suitable storage medium 16 associated with the microprocessor, such as a RAM, a Flash memory or a hard disk. The microprocessor 15 is arranged to at least partly carry out the method according to embodiments of the present invention when the appropriate computer program 17 comprising computer-executable components is downloaded to the memory 16 and executed by the microprocessor 15. The storage medium 16 may be a computer program product comprising the computer program 17. Alternatively, the computer program 17 may be transferred to the storage medium 16 by means of a suitable computer program product, such as a floppy disk or a memory stick. As a further alternative, the computer program 17 may be downloaded to the storage medium 16 over a network. The microprocessor 15 may alternatively be embodied in the form of an application specific integrated circuit (ASIC), a field-programmable gate array (FPGA), a complex programmable logic device (CPLD), etc.

Power consumption of the terminals 11, 12, 13 when performing UL communication with the eNodeB depends to a great extent on the number of transmissions performed by the respective terminal. Thus, given the same amount of data to be transmitted, it is more energy efficient for the terminal to transmit the data in a single transmission as compared to apportioning the data over a plurality of transmissions.

Figure 2:
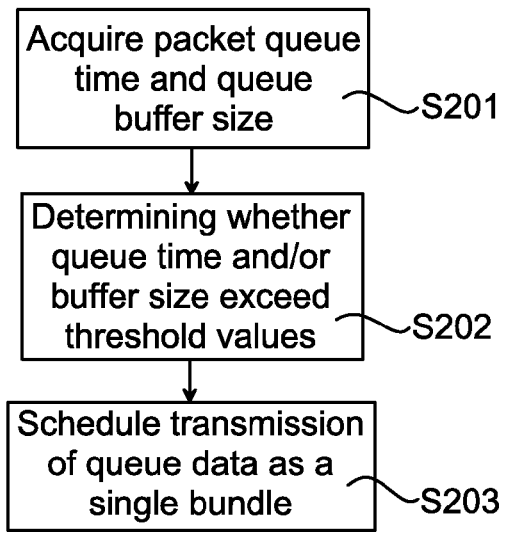
FIG. 2 shows a flow chart illustrating the method of scheduling transmission of queued data packets according to an embodiment of the present invention.

FIG. 2 shows a flow chart illustrating the method of scheduling transmission of queued data packets according to an embodiment of the present invention. In a first step, S201, the scheduler 15 of eNodeB 14 acquires from the terminals 11, 12, 13 information indicating packet queue time and queue buffer size of the respective terminal. It is to be understood that the scheduling could be undertaken for a single terminal, but in practice, scheduling is undertaken for tens, hundreds or even thousands of terminals, more or less simultaneously. The information pertaining to the terminal queues can either be estimated at the eNodeB or submitted from the terminals to the eNodeB. Further, in step S202, the scheduler determines, for one or more queues of each terminal, whether either estimated data packet delay for any queued data packet exceeds a delay threshold value or whether number of data packets queued exceeds a buffer size threshold value. Finally, in step S203, if either or both of the thresholds are exceeded, the scheduler schedules, for each terminal, the data packets of each queue for transmission as a respective single bundle of data.

Thus, by determining—for each queue of every terminal—whether either estimated packet delay for any queued data packet exceeds a delay threshold value or the number of packets queued exceeds a buffer size threshold value, a decision can be made whether the queued packets are ready to be transmitted. As a result, the data packets of each queue are combined into a single data bundle which subsequently is transmitted. By reducing the number of UL transmissions, the terminal power consumption is advantageously reduced.

Again with reference to FIG. 1, when determining which terminal(s) 11, 12, 13 should be scheduled for transmission, order of priority among the terminals is determined by the scheduler 15 of the eNodeB 14 in an embodiment of the present invention. Hence, when data packets in one or more queues of the respective terminal are ready for transmission, the scheduler 15 must assign an order of precedence to the terminals and thus determine which one of the terminals should be scheduled for transmission. This may be undertaken by assigning a weight to each terminal, thereby indicating the order of priority of the respective terminal.

Thus, an objective of the scheduler in this particular embodiment is to assign to the terminals an order of priority with which they are to comply when transmitting the scheduled data packets. In practice, a terminal which is to send its scheduled data as a single bundle is assigned a resource block (rb) in which the bundle can be transmitted in accordance with the following algorithm:

$$U(rb) = \operatorname*{argmax}_{u}(f_{cq}(u, rb) + W_u(q)), u = 0 \ldots m-1,$$

where

U(rb) is the terminal to be scheduled for the given resource block rb, rb is the allocated resource block, u represents the candidate terminal that should be scheduled, u=0 ... m−1, $f_{cq}$(u,rb) represents transmission channel quality in the allocated resource block for the terminal u, and $W_u$(q) is a weighting factor of terminal u and is a function of data in different queues q of the terminal u and most often it is the maximum value, i.e. in case there are multiple queues in the terminal, the scheduling decision is typically based on the queue that has highest weight.

In this particular embodiment of the present invention, $W_u(q)=W_d(q)+W_b(q)$, where $W_d$(q) is a weight based on the previously mentioned packet delay for the given queue, and $W_b$(q) is a weight based on the previously mentioned buffer size for the given queue.

Thus, transmission of the scheduled data packets of each queue is prioritized on the basis of a combination of the estimated packet delay for any queued data packet and the number of packets queued. A queue is given a higher order of priority the more the estimated packet delay and the number of queued packets exceed their respective threshold value, represented by weights $W_d$(q) and $W_b$(q), respectively. In case neither of the two thresholds is exceeded, the respective weight is set to zero, and the terminal will not be scheduled for transmission. However, in case any one or both of the two thresholds are exceeded, the data packets in the particular queue are considered important and urgent to transmit, and will thus be given priority.

As can be seen from the algorithm set forth in the above, the candidate terminal having the highest total weight considering estimated packet delay and number of queued packets for any queue (and possibly also channel quality, even though channel quality could be omitted in the algorithm in embodiments of the invention) will be prioritized and assigned a resource block where the single bundle of data can be transmitted.

Figure 3:
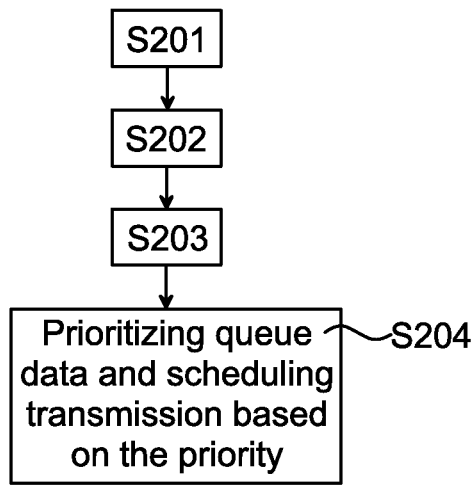
FIG. 3 shows a flow chart illustrating prioritizing queue data to be scheduled for transmission in accordance with an embodiment of the present invention.

FIG. 3 shows a flow chart illustrating the described procedure of prioritizing queue data to be scheduled for transmission. Similar to the method described with reference to FIG. 2, the scheduler 15 of eNodeB 14 acquires in step S201 information from the terminals 11, 12, 13 indicating packet queue time and queue buffer size of the respective terminal. In step S202, the scheduler determines, for one or more queues of each terminal, whether estimated data packet delay for any queued data packet exceeds a delay threshold value and/or whether number of data packets queued exceeds a buffer size threshold value. Thereafter, in step S203, if either or both of the thresholds are exceeded, the scheduler schedules, for each terminal, the data packets of each queue for transmission as a respective single bundle of data. However, in this particular embodiment, the queue data are prioritized in step S204 in accordance with the procedure described in the above and the scheduling is undertaken based on the weight/priority assigned to each terminal, where a higher weight/priority will give a terminal precedence in relation to a lower-weight terminal.

Figure 4:
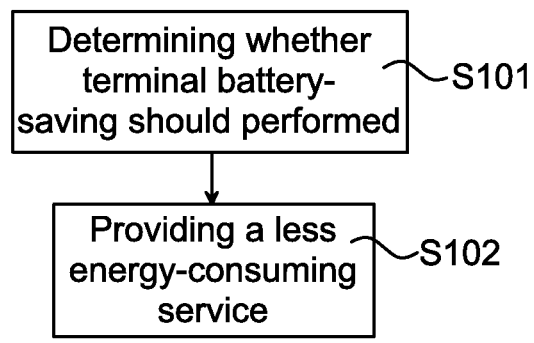
FIG. 4 shows a flow chart illustrating a method of performing battery-saving for a terminal according to a second aspect of the present invention.

With reference to FIG. 1 and FIG. 4, in a second aspect of the present invention, battery-saving for a terminal 11, 12, 13 is performed by having the scheduler 15 of the eNodeB 14 determine in step S101—either by estimation at the eNodeB or by receiving such information from the terminal—whether terminal battery-saving is to be performed. If that is the case, a less power-consuming communication service equivalent to that presently used is provided to the terminal in step S102, which equivalent communication service has a lower QoS. Thus, battery efficiency is traded for user performance; if a terminal engages in a communication service which is less power-intensive than that presently performed, battery life can be prolonged at the expense of lower QoS.

Figure 5:
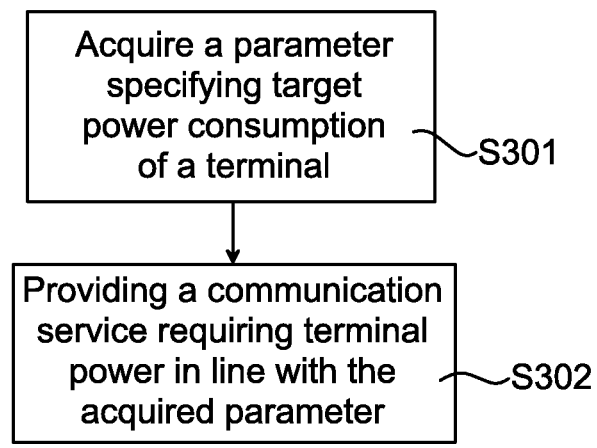
FIG. 5 shows a flow chart illustrating a method of performing battery-saving for a terminal according to a third aspect of the present invention.

With reference to FIG. 1 and FIG. 5, in a third aspect of the present invention, battery-saving for a terminal 11, 12, 13 is performed by having the scheduler 15 of the eNodeB 14 acquire, in step S301, a parameter specifying target power consumption of the terminal and provide, in step S302, a communication service to the terminal such that the terminal power consumption required to performing the communication service complies with the parameter. Advantageously, a terminal can be identified as a terminal generally wishing to save battery power. This may for instance be indicated in the SPID of the terminal by having the user sign a "power-saving" service agreement with the operator. Thus, the eNodeB will check a registered power parameter and provide a QoS in line therewith.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method of scheduling transmission of queued data packets of at least one terminal comprising:
   acquiring information indicating packet queue time and queue buffer size;
   scheduling transmission of queued data packets, for each queue of each terminal, such that all the data packets in a queue are to be transmitted as a single bundle of data, in response to determining at least one of:
   an estimated data packet delay of any data packet in the queue exceeds a delay threshold value; and
   a number of data packets in the queue exceeds a buffer size threshold value;
   prioritizing transmission of the scheduled data packets of each terminal on the basis of a combination of the estimated packet delay for any queued data packet and the number of packets queued, wherein a terminal is given a higher order of priority the more the estimated packet delay and the number of queued packets exceed their respective threshold value.

2. The method of claim 1, wherein acquiring the information indicating packet queue time comprises estimating the packet queue time on the basis of a scheduling request or buffer status report received from the at least one terminal.

3. The method of claim 1, wherein acquiring the information indicating the queue buffer size comprises receiving from the at least one terminal information indicating the queue buffer size.

4. The method of claim 1, further comprising:
   determining whether terminal battery-saving should be performed;
   when the terminal battery-save should be performed, modifying at least one of the delay threshold value and the buffer size threshold value; and
   determining, for each queue of the at least one terminal, whether either estimated data packet delay for any queued data packet exceeds the modified delay threshold value or whether number of data packets queued exceeds the modified buffer size threshold value.

5. A device for scheduling transmission of queued data packets of at least one terminal, the device comprising a processing unit arranged to:
   acquire information indicating packet queue time and queue buffer size;
   schedule transmission of queued data packets, for each queue of each terminal, such that all the data packets in the queue are to be transmitted as a single bundle of data, in response to determining at least one of:
an estimated data packet delay of any data packet in the queue exceeds a delay threshold value; and
a number of data packets exceeds a buffer size threshold value;

prioritize transmission of the scheduled data packets of each terminal on the basis of a combination of the estimated packet delay for any queued data packet and the number of packets queued, wherein a terminal is given a higher order of priority the more the estimated packet delay and the number of queued packets exceed their respective threshold value.

6. The device of claim 5, wherein the processing unit is arranged to estimate the packet queue time on the basis of a scheduling request or buffer status report received from the at least one terminal.

7. The device of claim 5, wherein the processing unit is arranged to receive, from the at least one terminal, information indicating the queue buffer size.

8. The device of claim 5, wherein the processing unit is arranged to:
determine whether terminal battery-saving should be performed;
when the terminal battery-saving should be performed, modify at least one of the delay threshold value and the buffer size threshold value; and
determine, for each queue of the at least one terminal, whether either estimated data packet delay for any queued data packet exceeds the modified delay threshold value or whether the number of data packets queued exceeds the modified buffer size threshold value.

* * * * *